Dec. 10, 1929.   O. BÖHM   1,738,684
VOLTAGE LIMITING ARRANGEMENT FOR INTERMEDIATE CIRCUIT TRANSMITTERS
Filed Dec. 15, 1924
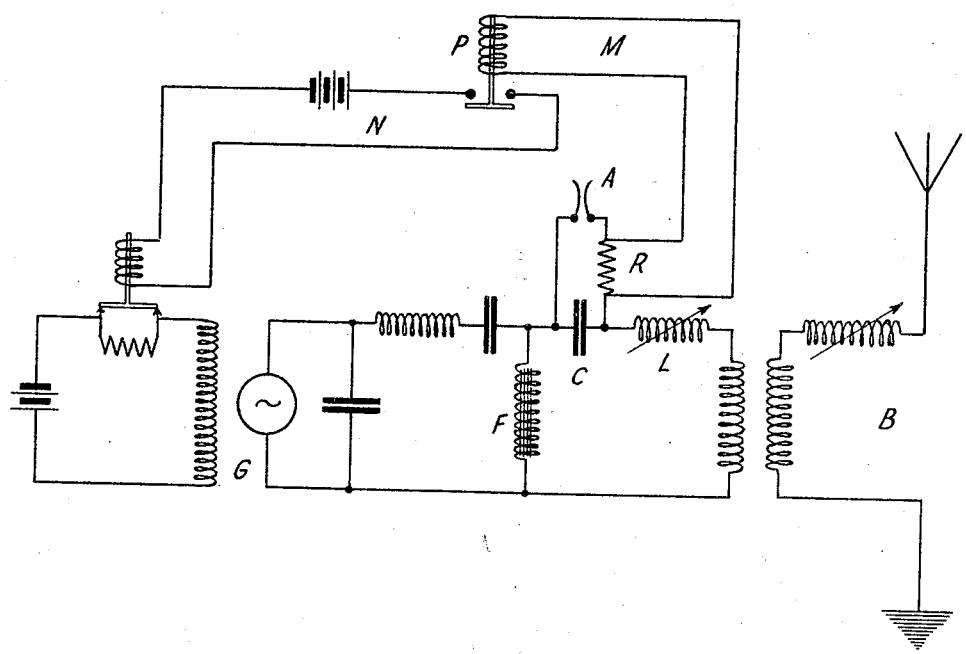
INVENTOR
OTTO BOHM
BY *Ira J Adams*
ATTORNEY Patented Dec. 10, 1929

1,738,684

UNITED STATES PATENT OFFICE

OTTO BÖHM, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

VOLTAGE-LIMITING ARRANGEMENT FOR INTERMEDIATE-CIRCUIT TRANSMITTERS

Application filed December 15, 1924, Serial No. 755,900, and in Germany December 22, 1923.

My invention relates to means for preventing too high a voltage from obtaining across apparatus in a radio transmitter.

It has for its object to provide such an arrangement which will effectively prevent the voltage from reaching a dangerous value by destroying the condition of resonance.

Another object is to provide means operable by an excessive voltage for controlling the energy supplied.

These and other objects will be apparent from the following description and claims when considered with the accompanying drawing in which the single figure is an arrangement embodying my invention and where the high frequency is supplied from a frequency multiplier.

It is known that the circuit of an intermediate circuit transmitter which lies between aerial and generator of the operating frequency is usually tuned as accurately as possible to the operating frequency. If the tuning of the aerial is altered, or if a detuning takes place because of any disturbance, the intermediate circuit acts nearly as a short circuit for this operative frequency since the change in tuning removes practically all the load from the generator. The current greatly increases since the circuit with the load removed is nearly a tuned circuit and high voltages are generated across the tuning means of the intermediate circuit and are dangerous for the arrangement.

According to the invention a horn-shaped lightning arrester is arranged in the intermediate circuit and this lightning arrester bridges over part of the tuning means, as for instance, the condenser. If L denotes the effective inductance of the intermediate circuit and C denotes its capacity, and the total resistance of the lightning arrester circuit is adjusted smaller than $\sqrt{\dfrac{L}{4C}}$, the intermediate circuit cannot oscillate any more after a spark discharge. If the aerial is greatly detuned, the spark discharge across the horn-shaped lightning arrester is repeated. Therefore it is appropriate to affect a relay by the current of the arrester circuit by which the transmitter is placed out of operating condition. This can, for instance, be attained by detuning the first circuit or by influencing the excitation of the generator, or finally by any other known means.

Referring now to the drawing, the transmitting arrangement consists of a generator G and a static frequency changer F to which is connected the intermediate circuit which is tuned by condenser C and inductance L to the operating frequency. B is the aerial circuit. The horn-shaped lightning arrester A is connected in parallel to the condenser C. The arrester circuit contains a resistance R from which a circuit M is branched off to actuate a relay P as soon as a spark discharge takes place in the arrester circuit. The relay circuit N acts upon the excitation of the alternating current generator G by removing a short circuit from the field resistance, thereby decreasing the voltage generated.

Having described my invention, I am entitled to all modifications thereof, as fall fairly within the scope of the following claims:

1. In an arrangement for avoiding excessive current and voltage, the combination of a transmitting circuit including a reactance, a power supply means coupled to said transmitting circuit, an arrester circuit bridging part of the reactance of the transmitting circuit, and comprising a resistance and a lightning arrester having a spark gap, a relay controlled by the voltage across said resistance, and means controlled by said relay for controlling said power supply means.

2. In an arrangement for avoiding excessive voltage, the combination of a generator having an output circuit, a transmitting circuit coupled thereto, an arrested circuit connected to the transmitting circuit and comprising a lightning arrester and an impedance, and means controlled by said impedance for lowering the output voltage of said generator.

3. In an arrangement for avoiding dangerous increases of current and voltage in radio transmitter circuits, the combination of a generator, an intermediate circuit, an arrester circuit and a relay circuit, part of the reactance of the intermediate circuit being bridged by the arrester circuit, said arrester circuit comprising a resistance and a spark gap, said resistance being shunted by a relay circuit and means controlled by said relay circuit for controlling the field circuit of the generator and thereby controlling the output of the generator.

4. In an arrangement for avoiding dangerous increases of current and voltage in radio transmitter circuits, the combination of a generator circuit having a resistance therein, a utilization circuit comprising a reactance connected to said generator, an arrester circuit comprising a gap and a resistance, part of the reactance of the utilization circuit being bridged by the arrester circuit, a first relay circuit in shunt to the resistance of said arrester circuit and a second relay circuit having a pair of contacts which are conductively connected by the relay of the first relay circuit, the operation of the relay of the second relay circuit serving to insert the first resistance in the generator circuit and thereby control the output of the generator.

5. In a radio transmission system, the combination of an oscillating circuit comprising an inductance L and a capacity C, means for preventing excessive voltage in said circuit comprising a circuit including a lightning arrester and a resistance in series connected across one of the reactances of the oscillating circuit, the total resistance of said arrester circuit being less than $\sqrt{\dfrac{L}{4C}}$.

Dr. OTTO BÖHM.